United States Patent [19]

Kristensen

[11] Patent Number: 5,000,474
[45] Date of Patent: Mar. 19, 1991

[54] TRAILER COUPLING DEVICE

[75] Inventor: Stig Kristensen, Hallstahammar, Sweden

[73] Assignee: Siarr Sweden AB, Sweden

[21] Appl. No.: 412,652

[22] Filed: Sep. 26, 1989

[30] Foreign Application Priority Data

Sep. 30, 1988 [SE] Sweden .............................. 8803492

[51] Int. Cl.⁵ .............................................. B60D 1/52
[52] U.S. Cl. ................................. 280/491.5; 280/511; 403/317
[58] Field of Search ...................... 280/491.5, 477, 504, 280/511, 491.3, 483

[56] References Cited

U.S. PATENT DOCUMENTS 4,807,899  2/1989  Belcher ............................... 280/477

FOREIGN PATENT DOCUMENTS 0045829  2/1982  European Pat. Off. ............ 280/477
151099   8/1985  European Pat. Off. .
3327834  2/1985  Fed. Rep. of Germany ...... 280/504

Primary Examiner—Charles A. Marmor
Assistant Examiner—Victor E. Johnson
Attorney, Agent, or Firm—Eckert Seamans Cherin & Mellott

[57] ABSTRACT

A locking device at a trailer coupling, including a first part (1), which is adapted to be attachable to a towing vehicle, and a second part (2), which is adapted to be coupled to a trailed vehicle and to be releasably attachable to the first part (1). The first part (1) includes an opening (8), into which the second part (2) is introducable, and a locking bolt (10), which is displaceable in its axial direction into the opening (8) in the first part (1) to lock the second part (2) by engagement in a locking recess (11) therein in the position thereof where it is introduced in the opening (8) of the first part (1). The locking bolt (10) is urged by a spring (20) in a direction towards the opening (8) in the first part and manually operable in the opposite direction. The locking bolt (10) is also adapted to be positively displaceable in a direction into the opening (8) in the first part (1) as well as out of the opening by screwing motion between co-acting first and second threads (33,32, respectively) associated with the first part (1) and the locking bolt (1), respectively, said threads (32,33) being arranged such that their co-action ceases after a certain displacement of the locking bolt (10) in the latter direction and the locking bolt (10) becomes displaceable independently of the threads (32,33) against the action of the spring (20).

5 Claims, 3 Drawing Sheets

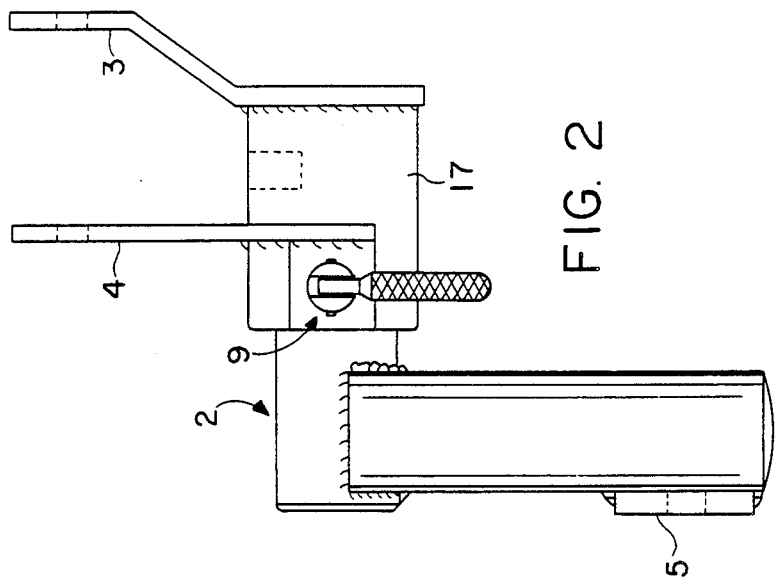
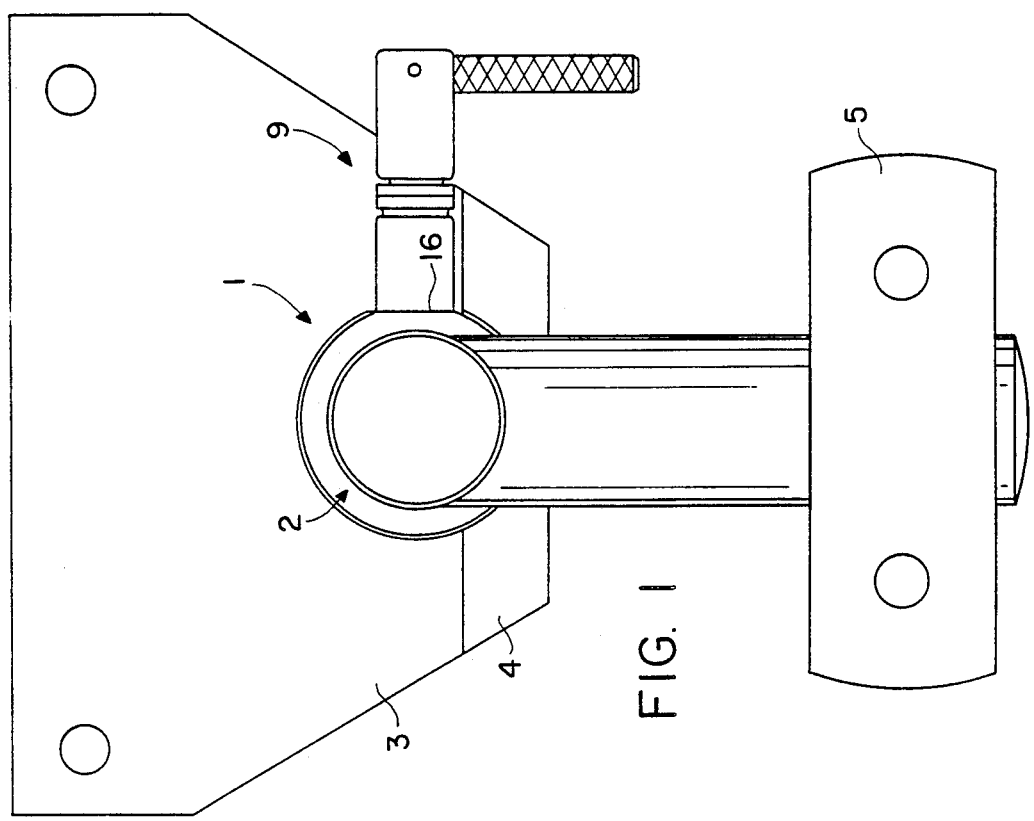

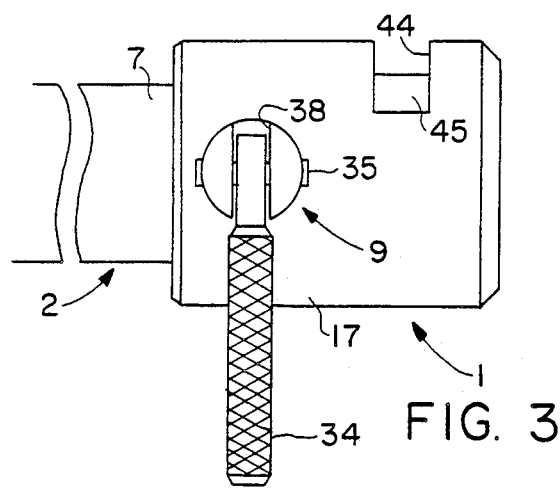
FIG. 3
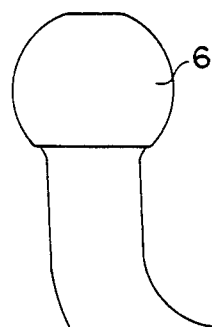
FIG. 4
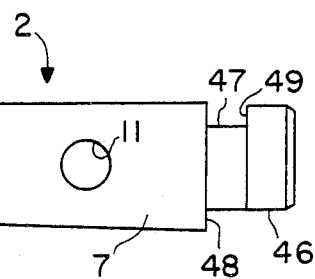
FIG. 5
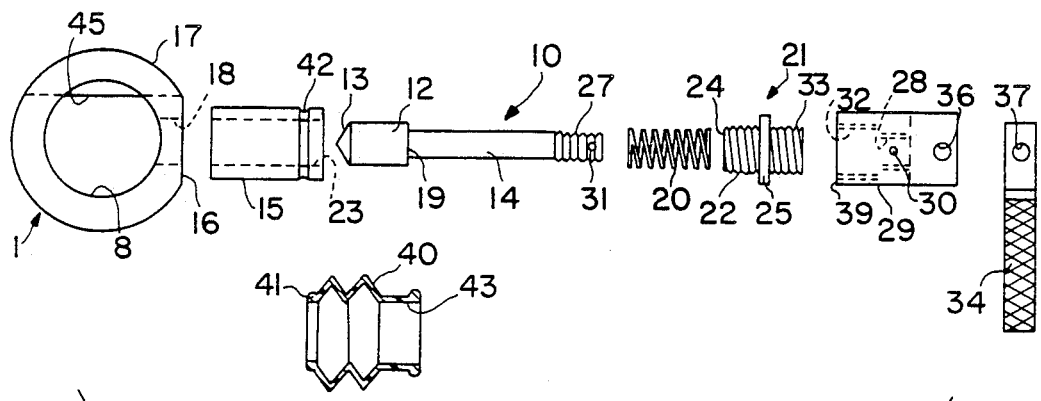

TRAILER COUPLING DEVICE

BACKGROUND OF THE INVENTION

The present invention concerns a trailer coupling device, including a first part, which is adapted to be attachable to a towing vehicle, and a second part, which is adapted to be coupled to a trailed vehicle and to be releasably attachable to the first part, the first part including an opening, in which the second part is introduceable, and a locking bolt, which is displaceable in its axial direction into the opening in the first part to lock the second part in the position thereof where it is introduced in the opening by engagement in a locking recess therein, and which is urged by a spring in the direction towards the opening in the first part and manually operable in the opposite direction.

A device of this kind is known from SE-B-8400369-8 and serves on one hand to enable the use of interchangeable second parts, such as various towing devices of the ball type or various cargo carrying devices, such as bicycle carriers, and on the other hand to lock the second part against being pulled out and/or being rotated in the position thereof where it is introduced in the first part. In the known device, the spring constantly acts against the locking bolt to keep it in its locking, advanced position, in which further movement of the locking bolt is prevented by an abutment in the housing, in which it is guided. Retraction of the locking bolt —in order to release the second part for substitution or rotation thereof —is carried out manually against the action of the spring. The locking bolt comprises two parts threaded in each other, viz. a foremost, non-rotatable part and a rear, rotatable part, which are screwed from each other in order to prevent inadvertent release of the second part, so that the rear one of these parts abuts a portion of the housing, in which the locking bolt is guided. In this position the locking bolt is positively prevented from backward movement, i.e. to release the second part. Simultaneously, the locking bolt is merely forced harder against the abutment in the guide housing, i.e., it is also prevented form further forward movement into the locking recess. Thus, there is no possibility to achieve compensation for e.g. wear caused by play between the locking bolt and the locking recess in the second part, or, more generally, between the first part and the second part, since the locking bolt cannot be positively displaced beyond the abutment in the guide housing in order to —as a complement to the spring force —be further forced into the locking recess.

SUMMARY OF THE INVENTION

The present invention proposes a different solution to the problem of achieving locking and release of the second part, whereby is simultaneously acheived positive introduction of the locking bolt in the locking recess, a.o. in order to compensate for wear. This solution appears from the characterizing clause of claim 1.

The invention will be described hereinafter with reference to the accompanying drawings, wherein:

FIG. 1 is a view showing a device according to the invention as seen from the rear in a forward direction towards an imagined towing vehicle, the two parts of the device being assembled and inter-locked and there further being shown some details irrelevant to the invention intended for mounting the device on a towing vehicle;

FIG. 2 shows the same device seen from the right according to FIG. 1;

FIG. 3 shows the parts of the device according to the invention in an assembled state seen from the right in FIG. 1;

FIG. 4 is a view from the right of the second part of the device;

FIG. 5 shows the details of the first part in an axially spaced view seen from the rear, protective bellows being shown next to these details;

DETAILED DESCRIPTION

Figure 6:
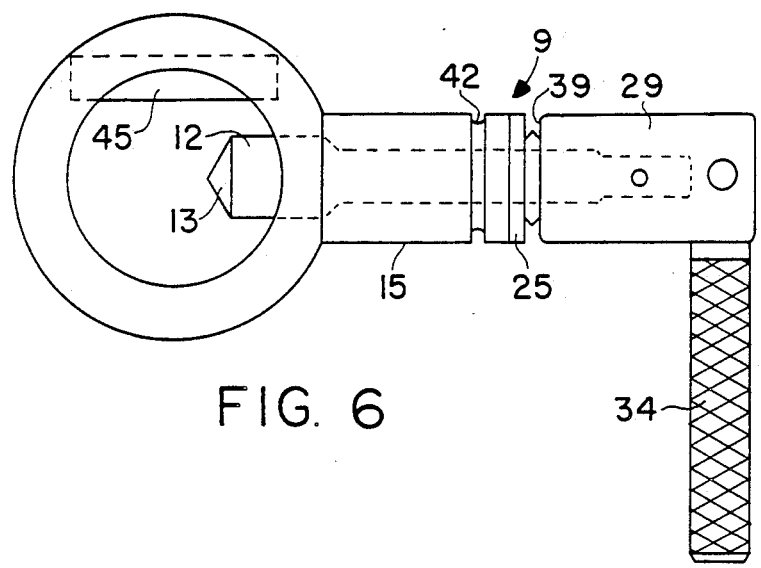
FIG. 6 is a rear view showing the first part of the device with the locking bolt in a fully locking position.

The locking device according to the present invention is included in a conventional towing device for trailed vehicles comprising two parts, viz., a first part 1, which is intended to be mounted on a non-shown towing vehicle, and a second part 2, which is intended to be connected to the first part 1. The first part 1 is shown in FIGS. 1 and 2 to be provided with mounting plates 3 and 4 for its mounting onto a towing vehicle. The second part 2 may be provided with an attachment plate 5 (FIGS. 1 and 2) for carrying a towing device or a cargo-carrier, or it may be directly provided with, e.g., a towing ball 6 (FIG. 4).

As is customary, the second part 2 has a cylindrical portion 7, which is intended to be introduced in a corresponding cylindrical opening 8 in the first part 1 and to be locked in one or more positions in its introduced state. For this purpose the first part 1 is provided with a locking device 9, including a locking blot 10 (FIG. 5, 6, 7 and 8), and the cylindrical portion 7 of the second part 2 is provided with a corresponding locking recess 11 (FIG. 4).

The second part may be provided with several locking recesses 11 to enable its setting in several pre-determined rotational positions relative to the first part 1 and to lock it in an optional of these positions. Such locking may be in regard to rotation of the second part 2 as well as retraction thereof from the first part 1, or one of these functions, even if the main locking against retraction is usually achieved by co-operating abutment means provided on the parts 1 and 2, e.g., as will be described below. It can also be contemplated to prevent rotation of the second part 2 relative to the first part 1 by the parts being provided with corresponding polygonal sections, such as square or regularly hexagonal ones.

The components of the locking device 9 according to the present invention are shown in an exploded view in FIG. 5. The locking bolt 10 comprises a foremost cylindrical portion 12 forwardly terminating in a conical tip 13 and backwardly connecting to an extended stem 14 having a smaller diameter than the cylindrical portion 12. The cylindrical portion 12 is guided in an at least internally cylindrical guide sleeve 15, which by means of, e.g., welding is attached to a planed surface 16 of the coupling housing 17 of the first part 1, the housing in this embodiment being cylindrical. Through the wall of the coupling housing 17 extends a bore 18 coaxial with the guide sleeve 15, through which the cylindrical portion 12 of the locking bolt is introduceable and which also may serve for guiding the cylindrical portion 12. Between the cylindrical portion 12 of the locking bolt 10 and its stem 14 there is a shoulder 19 which serves as a supporting surface for one end of a helical compression spring 20 which is arranged about the stem 14 of the locking bolt 10 and the diameter of which is smaller than the inner diameter of the guide sleeve 15. The other end of the spring 20 is supported against an abutment in the guide sleeve 15, the abutment in this embodiment comprising an intermediate sleeve 21. This sleeve is provided with external threads 22 at one end and is screwed into internal threads 23 in the guide sleeve 15, such that the spring 20 bears against the sleeve end 24 and such that the stem 14 of the locking bolt extends through the intermediate sleeve and is guided therein. The extent to which the intermediate sleeve 21 can be screwed into the guide sleeve 15 is limited by abutment against an external flange 25. Unscrewing of the intermediate sleeve 21 is prevented by any kind of locking means, such as a rivet 26 (FIG. 8) driven-in between the external end of the guide sleeve and the flange 25 of the intermediate sleeve, glueing or welding.

As now described, the spring 20 is freely acting between the shoulder 19 of the locking bolt 10 and the end 24 of the intermediate sleeve to urge the locking bolt 10 through the guide sleeve 15 and the bore 18 into the opening 8 of the coupling housing 17.

The free end of the stem 14 of the locking bolt 10 extending through and out of the intermediate sleeve 21 is provided with threads 27. These are screwed into internal threads 28 at the bottom of a clamping sleeve 29. By means of a non-shown spring pin, a rivet, or the like element extending through holes 30 in the clamping sleeve 29 and a hole 31 in the stem 14 of the locking bolt 10, these two components are mutually unrotatably joined. The clamping sleeve 29 is also provided with internal threads 32 corresponding to external threads 33 at the end of the intermediate sleeve 21 opposite to the threads 22. By means of a rivet 35 (FIG. 3) a handle 34 is pivotably mounted in a slot 38 at the free outer end of the clamping sleeve 29, the rivet extending through a hole 36 in the clamping sleeve 29 and a hole 37 in the handle 34. By the arrangement now described, the locking bolt 10 is rotatably connected to the clamping sleeve 29 and its handle 34, at the same time as forwardly movement thereof under the influence of the spring 20 is prevented.

Figure 7:
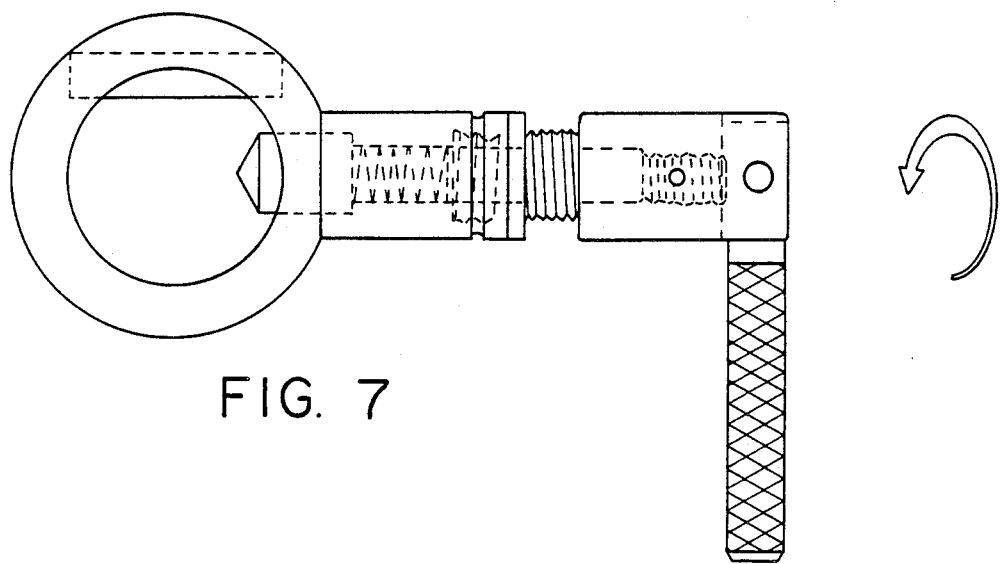
FIG. 7 is a view similar to the one according to FIG. 6 with the locking bolt in a partially locking position.
Figure 8:
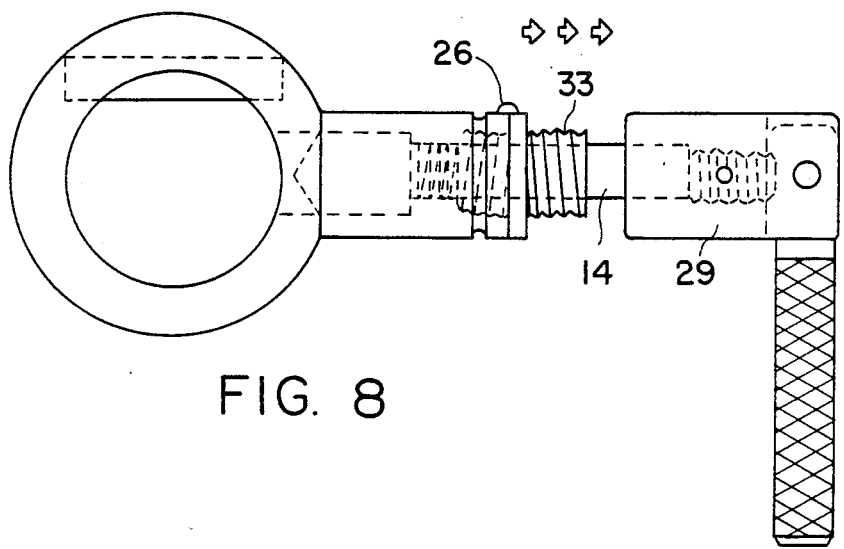
FIG. 8 is a view similar to the one according to FIGS. 6 and 7 with the locking bolt in a released position.

By clockwise rotation of the clamping sleeve 29, when the threads 32 and 33 are normal right-hand threads, the clamping sleeve 29 now can be screwed onto the intermediate sleeve 21, whereby the locking bolt is positively moved in a direction towards the opening 8 in the coupling housing 17 (FIG. 6). By rotation of the clamping sleeve 29 in the opposite direction the locking bolt 10 is pulled out of the opening 8 until co-action between the threads 32 and 33 ceases (FIG. 7). In this position, the spring 20 keeps the clamping sleeve 29 urged against the intermediate sleeve 21 and the locking bolt 10 in a spring-loaded, partially advanced intermediate position. By manual operation of the intermediate sleeve 29 by means of the handle 34, the locking bolt 10 now can be further pulled out of the opening 8 against the action of the spring 20 (FIG. 8).

The elements of the locking device 8 are relatively dimensioned such that the cylindrical portion 12 of the locking bolt 10 extends into the opening 8 of the coupling housing 17 when the thread engagement of the clamping sleeve 29 with the intermediate sleeve 21 has ceased (FIG. 7). In this position, under the spring-loaded condition of the locking bolt, the cylindrical portion of the locking bolt engages the locking recess 11 of the second part 2 introduced into the opening 8, the second part being, e.g., a ball coupling according to FIG. 4. By screwing the clamping sleeve 29 the cylindrical portion 12 and the conical tip 13 of the locking bolt are positively moved further into the locking recess 11 in order to securely lock as well as play-compensating clamp the second part 2 in the opening 8 (FIG. 6). In this position, there shall be a sufficient space between the flange 25 of the intermediate sleeve and the inner end 39 of the clamping sleeve 29 to allow further screwing in order to compensate for future wear (see FIG. 6). In the retracted position of the locking bolt (FIG. 8) its tip 13 shall have left the opening 8 completely in order to allow rotation as well as axial movement of the cylindrical portion 7 of the second part 2.

In order to protect the locking device 9 against intrusion of dirt, bellows 40, shown in FIG. 5 below the components of the locking device itself, can be arranged over the guide sleeve 15 and the clamping sleeve 29. The bellows 40 are axially resiliently extensible and engage with an annular bead 41 at one end in an annular groove 42 in the guide sleeve 15 and encircle the clamping sleeve 29 with a cylindrical portion 43 at the other end.

In the embodiment of towing device shown, the locking device 9 is intended to primarily lock against rotation of the second part 2. As a principal retraction catch of the first part 1 serves a stop dog 45 welded in a recess 44 cut from above in the coupling housing 17, the stop dog extending laterally over an upper portion of the opening 8. On the second part 2 the end of its cylindrical portion 7 is provided on one hand with a plane-milled surface 46 (turned downwards in the towing ball embodiment according to FIG. 4), the distance between which and the periphery of the cylindrical portion 7 being somewhat greater than the greatest distance between the stop dog 45 and the periphery of the opening 8, and on the other hand with an annular groove 47 adjacent to the plane-milled surface 46 and being somewhat wider than the stop dog 45 and as deep as the distance between the plane-milled surface 46 and the periphery of the cylindrical portion 7. The distance between the annular groove 47 and the locking recess 11 corresponds to the distance between the stop dog 45 and the locking bolt 10.

In order to connect a second part 2 to the first part 1, the second part 2, having its plane-milled surface 46 turned upwards, is introduced into the opening 8 in the coupling housing 17. The locking bolt 10 is retracted in advance, or, is now retracted, to the position shown in FIG. 8, such that the second part 2 can pass the locking bolt. The upwardly turned plane-milled surface 46 can freely pass below the stop dog 45. The introduction is limited by abutment between the inner side wall 48 of the annular groove 47 and the stop dog 45. In this position, the locking bolt 10 is released, so that it is pushed in by the spring 20 towards the opening 8 until it abuts the cylindrical portion 7 of the second part 2. Thereafter, the second part 2 is rotated, with the stop dog 45 running in the annular groove 47, until the tip 13 and cylindrical portion 12 of the locking bolt 10 projects into the locking recess 11 of the second part 2. In the towing ball embodiment according to FIG. 4 the towing ball 6 is now upwardly turned. In this position, the second part 2 is locked against retraction by abutment between the outer side wall 49 of the annular groove 47 and the stop dog 45 at the same time as rotation, as well as retraction, is prevented by the spring-loaded engagement of the locking bolt in the locking recess 11. In order to further improve the inter-locking between the parts 1 and 2, the locking bolt 10 is screwed in by means of the threads 32 and 33 until the conical tip 13 of the locking bolt is firmly pressed against the bottom of the locking recess 11, thereby eliminating possible play between the parts.

Suitably, the handle 34 may be arranged such that it is turned downwards in the operating, play-eliminating position of the locking device (FIG. 6), preventing unintended rotation in an unscrewing direction by its weight.

I claim:

1. A trailer coupling device, including a first part adapted to be attachable to a towing vehicle, and a second part adapted to be engaged by a coupling means connected to a trailed vehicle and to be releasably attached to said first part, said first part including an opening adapted to receive said second part and a locking bolt displaceable in its axial direction into said opening of said first part to lock said second part by engagement in a locking recess therein in a position of said second part where it is introduced in said opening of said first part, said locking bolt being urged by a spring in a first direction into said opening of said first part and manually operable in a second direction opposite to said first direction, wherein a first plurality of first threads, interengaged with a second plurality of second threads are provided for positively displacing said lock bolt in said first direction and said second direction, said interengaging threads being adapted to cease interengagement upon a predetermined displacement of said locking bolt in said second direction, and said locking bolt being further displaceable in said second direction against action of said spring upon ceasement of interengagement of said first and second threads.

2. A device according to claim 1, wherein said locking bolt is guided in a guiding means integrated with said first part and provided with said first threads.

3. A device according to claim 2, wherein said second threads are provided on a connecting means rotationally connected to said locking bolt.

4. A device according to claim 3, wherein said connecting means is also connected to said locking bolt for mutual force transmission in said first and second direction.

5. A device according to claim 4, wherein said connecting means is manually operably for rotation of said locking bolt as well as for displacement of said locking bolt in said second direction against action of said spring.

* * * * *